United States Patent [19]

Wilson

[11] 4,282,649

[45] Aug. 11, 1981

[54] INTERLOCKED WAVEGUIDE ASSEMBLY

[75] Inventor: Ronald A. Wilson, Medway, Mass.

[73] Assignee: Microwave Development Laboratories, Needham, Mass.

[21] Appl. No.: 66,036

[22] Filed: Aug. 13, 1979

Related U.S. Application Data

[63] Continuation-in-part of Ser. No. 900,736, Apr. 27, 1978, abandoned.

[51] Int. Cl.[3] .......... F16I 13/08

[52] U.S. Cl. .......... 29/600; 29/521; 333/254

[58] Field of Search .......... 148/11.5 A; 228/135, 228/136, 137; 29/521, 600; 138/120, 155; 285/382; 333/98 R, 254

[56] References Cited

U.S. PATENT DOCUMENTS

| | | | |
|---|---|---|---|
| 1,951,874 | 3/1934 | Kellar | 148/11.5 A |
| 3,460,304 | 8/1969 | Braeuninger et al. | 29/521 |
| 3,596,937 | 8/1971 | Baldelli | 138/155 |
| 3,909,756 | 9/1975 | Ritchie | 333/254 |
| 3,938,244 | 2/1976 | Merle | 29/600 |

FOREIGN PATENT DOCUMENTS

| | | | |
|---|---|---|---|
| 387968 | 2/1933 | United Kingdom | 72/368 |

*Primary Examiner*—Lowell A. Larson

*Attorney, Agent, or Firm*—Wolf, Greenfield & Sacks

[57] ABSTRACT

The waveguide assembly is constructed of interlocked sections of hollow rectangular waveguide which are abutted end to end. In a preferred version the abutted ends of the sections may be interlocked by grooving or dove-tailing the sections along the broad walls of the waveguide in a manner insuring alignment of the broad walls. One of the mated sections has locating tabs extending from its narrow walls. The tabs overlap the narrow walls of the adjacent interlocked section and maintain the narrow walls in alignment by preventing slippage along the dove-tail joint. The dove-tail joint is initially constructed in an open configuration and after annealing, the joint is closed by application of pressure thereto. Either one or both broad wall joints may be closed, and when only one is closed then the opposite joint is initially constructed in a closed position.

12 Claims, 11 Drawing Figures

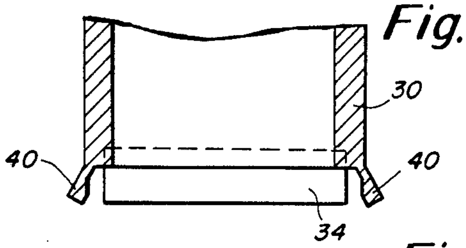
Fig. 6
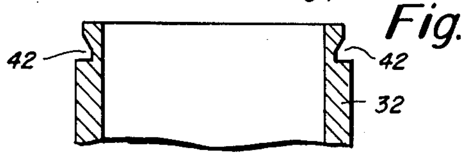
Fig. 7
Fig. 8
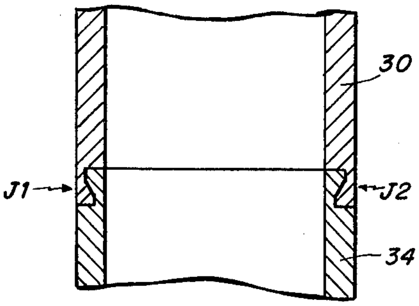
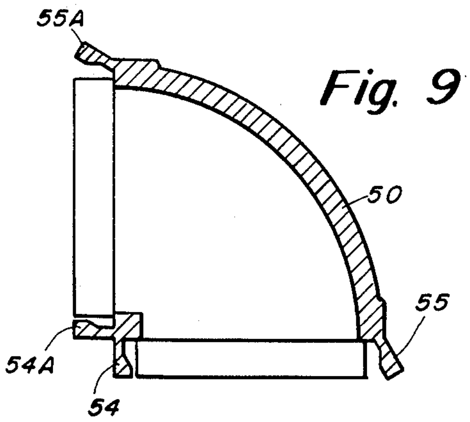
Fig. 9
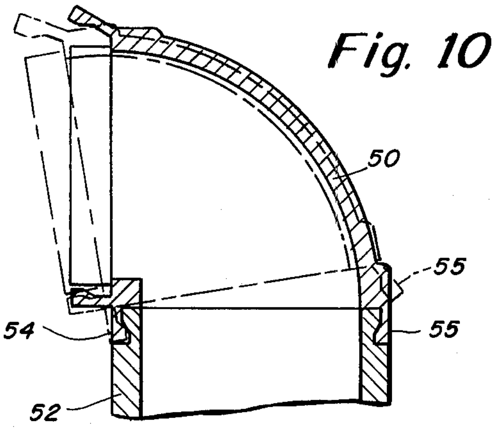
Fig. 10
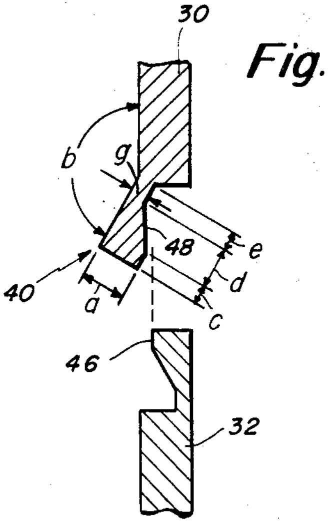
Fig. 11

INTERLOCKED WAVEGUIDE ASSEMBLY

RELATED APPLICATION

This is a continuation-in-part of application Ser. No. 900,736 filed Apr. 27, 1978, now abandoned.

BACKGROUND OF THE INVENTION

The present invention is concerned with the joining of sections of waveguide which are usually sections of rectangular waveguide that are used for the guided transmission of electromagnetic waves. The principles of this invention may be used in interconnecting any sections of waveguide including two straight sections of waveguide or a straight section of waveguide with a waveguide bend. The principles of the invention are particularly useful in interconnecting sections of waveguide prior to brazing wherein at least one of the sections is cast rather than machined. Usually, the waveguide bend is constructed by being cast whereas the straight sections of waveguide are constructed by a machining or extruding operation.

U.S. Pat. No. 3,596,937 to Baldelli discloses one prior art technique for joining, preferably by interlocking, sections of waveguide. This patent discusses in some detail the general objectives that are aimed at in interconnecting these sections. Important factors include mechanical stress at the joint, tightness of the joint, and proper alignment between the waveguide sections.

Although the structure shown in U.S. Pat. No. 3,596,937 is usable for interconnecting sections of waveguide, there have been some drawbacks associated with this technique. For example, when the pieces are snap-fitted together, there is a tendency for the metal to shear thereby resulting in a loose fit at the joint. Other prior techniques show the bending of a side flap to hold the sections together. In practice, it has been found that too many of the side flaps either broke or were too weak to maintain the relative positions of the two sections during brazing.

Accordingly, it is an object of the present invention to provide an improved interlocking technique for joining sections of waveguide prior to brazing usually including a waveguide bend.

Another object of the present invention is to provide a waveguide assembly in which the joined sections are interlocked to insure accurate alignment of the sections prior to brazing.

A further object is to provide an interlocked, preferably dove-tailed joint forming a mechanically strong joint and one that can be made quite tight.

A further object of the present invention is to provide a method of constructing an improved interlock joint between waveguide sections, at the same time providing proper alignment of the sections.

SUMMARY OF THE INVENTION

To accomplish the foregoing and other object of this invention there is provided a method of joining, preferably by interlocking, sections of hollow rectangular waveguide. The joined sections of waveguide abut end-to-end and the mated ends of the sections have cooperating means along the broad walls which form an interlocked, preferably dove-tailed joint between the sections. One of the sections preferably has locating tabs extending from its narrow walls and overlapping the adjacent narrow walls of the mated section so that the two waveguide sections are properly in alignment with each other. The method of this invention, although not specifically limited thereto, is particularly useful in intercoupling a straight section of waveguide with a waveguide bend. The straight section of waveguide may be constructed of a machined piece or an extruded piece while the waveguide bend is usually cast.

In accordance with the method of this invention, the cooperating means of one section is annealed so that it is at least temporarily softened. Preferably, the cast bend is annealed but because it is usually cast of a zinc-hardened aluminum alloy, the softened condition of the bend is maintained only for a relatively short period of time, typically 4–5 hours. This section that is annealed is initially constructed in an opened position and soon after the annealing takes place, the open sections are closed to form an interlocked assembly with the straight section of waveguide. Preferably, the sections are interlocked only along the broad walls. Thereafter, while the metal is still in a somewhat softened or annealed state, pressure is applied at the joint to close the joint by essentially closing the annealed cooperating means which is usually the annealed section of the joint on the waveguide bend. In one embodiment both joints may be closed while in an alternate embodiment one joint can be constructed in a normally closed position with only one joint being closed after interlocking. As mentioned, the dove-tail joint is preferred and is formed by smaller walled and greater walled sections with the thickness of the smaller walled section preferably being in the range of 5–40 thousandths of an inch.

BRIEF DESCRIPTION OF THE DRAWINGS

Numerous other objects, features and advantages of the invention should now become apparent upon a reading of the following detailed description taken in conjunction with the accompanying drawings in which:

FIGS. 6 and 7 show cross-sectional views through sections of waveguide that are to be mated showing a dove-tail joint construction similar to that depicted in FIGS. 1-5;

FIG. 8 is a cross-sectional view showing the sections depicted in FIGS. 6 and 7 in a joined position after the pressure-applying step;

FIG. 9 is a cross-sectional view through a waveguide bend showing its form of initial construction with only one of the two joints on each side constructed in an open position;

FIG. 10 depicts the waveguide section of FIG. 9 being joined with a section of waveguide such as depicted in FIG. 7 with the bend being illustrated in two different positions, one being a final interlocked position; and FIG. 11 is a fragmentary enlarged view at a typical joint showing the nature and form of the joint.

DETAILED DESCRIPTION

Figure 1:
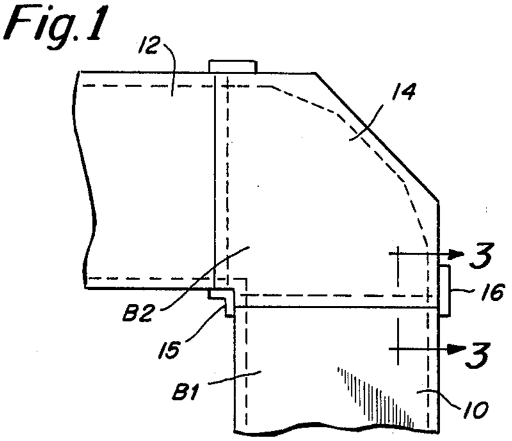
FIG. 1 is a top elevation view of an interlocked waveguide assembly including segments of two straight sections and a waveguide bend.
Figure 2:
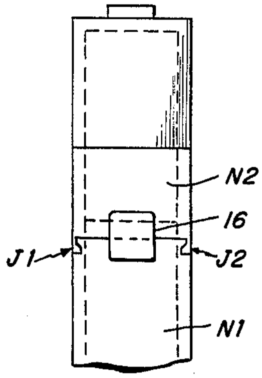
FIG. 2 is a side elevation view of the waveguide assembly shown in FIG. 1.
Figure 3:
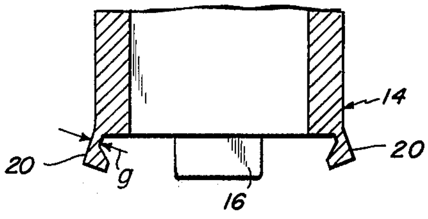
FIG. 3 is a cross-sectional view taken along line 3—3 of FIG. 1.
Figure 4:
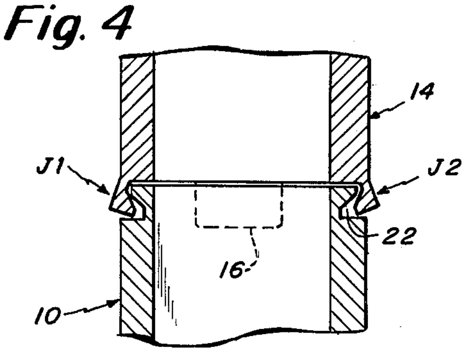
FIG. 4 is a cross-sectional view similar to the one shown in FIG. 3 with the mating sections in position prior to interlocking.
Figure 5:
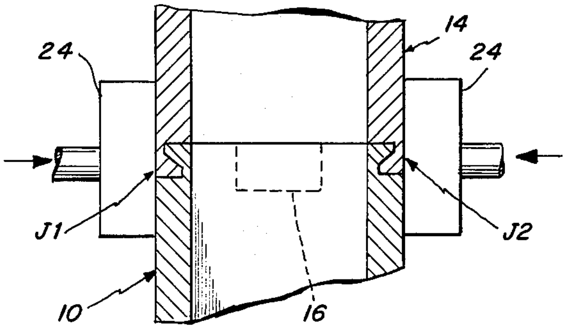
FIG. 5 is a further cross-sectional view showing the step of applying pressure at the joint to close the joint.

The interlock technique of this invention is described in one embodiment in FIGS. 1 and 2, showing straight hollow rectangular waveguide sections 10 and 12 interconnected by a hollow rectangular waveguide bend 14. However, it is understood that the technique of this invention may also be applied in connecting any other configurations of waveguide sections that are to be joined such as depicted in FIGS. 9 and 10. In FIGS. 3–5 the steps of the method are shown in sequence with the sections that are being joined being shown as sections 10 and 14. The sections shown in the drawing have their contiguous ends abutted and interlocked. The straight section 10, for example, has its broad walls B1 held in engagement with the corresponding broad walls B2 of the bend 14. The broad walls are interlocked by means of joints J1 and J2 shown in the open position in FIG. 4. FIG. 5 shows these joints closed in accordance with the method of this invention to form an interlocked, preferably dove-tail connection. The interlocked joints act to align the upper and lower broad walls while forming a mechanically strong union between the sections. In constructing these interlocked, preferably dove-tail joints the reduction in thickness caused by cutting the dove-tail like grooves (particularly in section 10) in the broad walls of the sections is preferably held to a minimum to avoid any undue weakening of the walls.

To prevent the sections from sliding relative to one another and to insure the accurate alignment of the narrow walls N1 and N2, shown in FIG. 2, one of the sections is provided with lateral tabs which overlap the narrow walls of the adjacent section. It is preferred to have the lateral tabs on the bent section 14 because that section can be readily cast or fabricated with those appendages whereas the straight section is usually an extrusion which is more difficult to alter. In the disclosed embodiment, the tabs 15 and 16 are integral with the narrow walls of the bent section 14 and overlap the narrow walls of the straight waveguide section 10. The straight waveguide section 10 is thus laterally confined between the tabs 15 and 16 and is prevented by these tabs from any endwise movement in either direction. Thus, the tabs prevent the section from sliding along the grooved joint.

FIGS. 1 and 2 show the joint in its final state. In accordance with the invention, however, one portion of the joint such as the interlocking legs 20 shown in FIG. 3 are initially constructed in an open position. The interlocking legs 20 shown in FIG. 3 may form a part of the bend section 14 and also a part of both of the joints J1 and J2 as depicted in FIG. 4. With the bend section 14, as depicted in FIGS. 3 and 4, having its joint end opened, the usually cast, bend section is softened by a known annealing process. When the bend section is cast of a zinc hardened aluminum alloy, this softening is maintained for approximately 3 or 4 hours or possibly longer, after which the metal material will again start to harden. Thus, during the time that it is softened the two sections are positioned as depicted in FIG. 4. Thereafter, pressure is applied as depicted in FIG. 5 by the illustrative pressure pistons 24 so as to close the legs 20 into the channels 22 thereby closing the joint. As long as the pressure is applied while the annealing is still in effect, then the interlocking legs 20 easily close to the position shown in FIG. 5 providing a tight joint along both broad walls of the waveguide assembly.

It is preferred that the interlocking legs 20 be initially constructed so that they are spread sufficiently so that the other section, such as section 10, shown in FIG. 4, can pass inbetween. It is preferred in positioning the sections as depicted in FIG. 4 that one side of the section 10 is inserted into, for example, the joint J1 and then the other side is rotated into the joint J2. There is preferably a slight snap fit between the parts in the position shown in FIG. 4 but there should be no problem with any shearing between the cooperating mating ends that form the joints J1 and J2.

In FIG. 5 is it noted that at the joints J1 and J2 the surfaces are linear between sections 10 and 14 on both inner and outer surfaces.

There are many modifications that can be made in the structure of the present invention. The interlocked, preferably dove-tail joint, can assume many different configurations. Also, the sections can be locked together by interlocking the narrow walls rather than the broad walls with the locating tabs being placed on the broad walls. However, as between the two arrangements, greater mechanical strength is obtained by interlocking the broad walls and therefore that arrangement is preferred. Furthermore, the concepts of this invention can be used with waveguide sections that are either cast, machined, or extruded; the only difference being that with a cast section that has been annealed, it must be used in a relatively short period of time or the piece will have to be re-annealed.

In a further technique according to the invention, a special type of casting material may be employed, wherein the annealing step may not be needed. In this case, the casting material is made of an alloy that is sufficiently pliable in itself so that the annealing step is not needed.

Further versions of the present invention are shown in FIGS. 6–11. FIGS. 6–8 depict the interconnection of two straight sections of waveguide while FIGS. 9 and 10 show the interconnection of a straight section of waveguide with a waveguide bend. FIG. 11 is an enlarged cross-sectional fragmentary view depicting one of the joints such as shown in FIGS. 6 and 7. FIG. 11 also shows some important dimensional relationships associated with the joint used in constructing the waveguide sections.

FIGS. 6–8 show the interconnection of two straight sections of waveguide. FIGS. 6 and 7 depict the sections separated while FIG. 8 depicts the two sections in their final interlocked position. In this version there is described straight hollow rectangular waveguide sections 30 and 32. These may be constructed from a type WR-62 waveguide. Locating tabs may also be provided associated with the narrow walls of the waveguide sections. One such locating tab 34 is depicted in FIG. 6. FIG. 8 shows the sections 30 and 34 interconnected at the respective broad wall joints J1 and J2. The same type of annealing process may be employed in closing the legs 40 to interlock with the grooves 42 to form these closed joints.

It is noted that the section 32 easily passes inside of the legs 40 and that there need not even be a snap fit between the pieces prior to the closing of the joints. In this regard FIG. 11 clearly depicts the important dimensional relationships associated with each joint. For example, it is noted that the surface 46 is disposed inwardly of the surface 48 on the piece 30. Preferably, the walls or surfaces 46 and 48 are substantially in parallel but spaced from each other to provide the clearance. In FIG. 11 the following table depicts specific dimensional limitations associated with a WR-62 waveguide:

TABLE A

| Parameter | Dimensions |
|---|---|
| a | 0.034 inch |
| b | 30° |
| c | 0.018 inch |
| d | 0.031 inch |
| e | 0.020 inch |
| g | 0.016 inch |

The dimensions depicted in FIG. 11 will cover, of course, change for different sizes of waveguide but preferably the dimension a is always approximately twice the dimension g. The dimension g which is one of the critical dimensions has to be kept relatively small and is preferably in the range of .005–.040 inch. It is preferred that the dimension g not be to thick as one would then have to use a relatively soft material to provide the bending to a closed position. Thus, the thinner that the dimension g can be made, the stronger the material for the section. However, on the other hand if the joint is too thin then it may not be sufficiently strong. Also, if the joint is made too thick there may be a problem in closing the joint requiring an excessive level of pressure to close the joint and thus possibly damaging the waveguide. Again, the desired range for the dimension g in the section 30 is in the range of .005–.040 inch.

FIGS. 9 and 10 show still another embodiment of the present invention including a waveguide bend 50 and a straight section 52 of waveguide. In this version it is noted that the leg 54 of the bend 50 is in its normal, finally closed position, whereas the other leg 55 is open. The positions of these legs are clearly depicted in FIG. 9. It is also noted that on the other end of the waveguide bend there are similarly arranged legs 54*a* and 55*a*. FIG. 10 shows the waveguide bend 50, in phantom, with its leg 54 interlocked with one broad wall joint of the waveguide section 52 with the other leg 55 being rotated into a position where it can pass relatively clearance-free into the other joint or the opposite broad wall of the waveguide section. FIG. 10 also shows, in solid, the leg 55 after having been closed into the accommodating groove in the broad wall of the waveguide section 52. With the arrangement of FIGS. 9 and 10 thus one of the joints is maintained in a closed position with only the other joint being initially opened. In this way only one joint has to be closed to form the final joint for interlocking the sections of waveguide. It is also noted that because of the parallel arrangement depicted in FIG. 11 between the surfaces 46 and 48 there is substantial ease in other different sections that pass each other.

Because the invention may be embodied in varied structures, it is not intended that the patent be limited to the forms here illustrated or described. Rather, it is intended that the patent be construed to embrace those waveguide assemblages which utilize the invention defined in the appended claims and include assemblages which are merely obvious equivalents of the invention defined in the appended claims.

What is claimed is:

1. A method of joining sections of hollow rectangular waveguide, which joined sections abut end-to-end, the mated ends of the sections having cooperating means along the broad walls which form interlocking joints between the sections, one of the sections having locating tabs extending from its narrow walls and overlapping the adjacent narrow walls of the mated section, said method comprising the steps of;

providing at least one of the interlocking means of at least one section in a yieldable state, providing said at least one of the interlocking means of the one section opened, joining said at least one of the interlocking means of the one section opened, joining the sections with a loose fit therebetween.

and applying pressure at the joint to close the interlocking means of one section against the interlocking means of the other section with the inner walls of the joined sections at the joint being coplanar forming a smooth contiguous inner hollow waveguide surface, wherein said joint is formed by at least one leg having contiguous thin-walled and thick-walled sections with the thin-walled section having a thickness in the range of 0.005 to 0.025 inch and with the thick-walled section having a thickness less than the waveguide wall thickness.

2. A method as set forth in claim 1 wherein the interlocking means is made yieldable by annealing.

3. A method as set forth in claim 1 wherein the sections are joined by first joining one side of interlocking means and rotating one section to then join the other side of interlocking means.

4. A method as set forth in claim 1 wherein pressure is applied concurrently to both opened interlocking means to close the interlocking joints.

5. A method as set forth in claim 2 wherein said annealing softens sufficiently to permit closing of the joint without weakening thereof.

6. A method as set forth in claim 1 wherein the sections include a straight section and a bent section, the locating tabs being on the bent section.

7. A method as set forth in claim 2 wherein said pressure applying step follows said annealing step by less than 3–4 hours when the cooperating means is cast.

8. A method as set forth in claim 1 wherein the thin-walled section has a dimension on the order of 0.016 inch.

9. A method as set forth in claim 8 wherein said thick-walled section has a dimension on the order of 0.034 inch.

10. A method as set forth in claim 1 wherein the thick-walled section has a dimension of about twice that of the thin-walled section.

11. A method as set forth in claim 1 wherein there is provided a taper section interconnecting the thin and thick-walled sections.

12. A method as set forth in claim 1 wherein the thin-walled section has a width dimension on the order of 0.016 inch, the thin-walled section has a length on the order of 0.020 inch, the thick-walled section has a width dimension on the order of 0.034 inch and the thick-walled section has a length at least on the order of 0.018 inch.

* * * * *